United States Patent [19]

Fallon

[11] Patent Number: 5,110,269
[45] Date of Patent: May 5, 1992

[54] GAS TURBINE FUEL PUMPING APPARATUS

[75] Inventor: James A. Fallon, Cincinnati, Ohio

[73] Assignee: General Electric Company, Cincinnati, Ohio

[21] Appl. No.: 602,821

[22] Filed: Oct. 24, 1990

[51] Int. Cl.$^5$ .............................................. F04B 23/04
[52] U.S. Cl. .................................... 417/428; 417/283
[58] Field of Search ................................ 417/428, 283

[56] References Cited

U.S. PATENT DOCUMENTS

| | | | |
|---|---|---|---|
| 2,257,095 | 9/1941 | Gottlieb | 417/428 |
| 3,930,759 | 1/1976 | Drutchas | 417/283 |
| 3,941,505 | 3/1976 | Nasvytis | 417/202 |
| 4,428,346 | 1/1984 | Hosh | 417/462 |
| 4,493,616 | 1/1985 | Bergin | 417/53 |

OTHER PUBLICATIONS

"Aircraft Gas Turbine Engine Technology", Second Edition, Irwin E. Treager, pp. 211–266.

Primary Examiner—Richard A. Bertsch
Assistant Examiner—Charles Freay
Attorney, Agent, or Firm—Jerome C. Squillaro

[57] ABSTRACT

A fuel pumping apparatus, particularly useful for gas turbine engines, includes a dual element positive displacement fuel pump having a centrifugal type boost stage and, downstream, at least two parallel gear type elements. A controllable means for unlocking at least one of the elements includes a bypass line which provides a flow path to the inlet of the fuel pump from the pressurizing chamber of the gear elements which is used to urge end bearings of the gear elements into contact with the revolving gears thereby enabling the gears to pump fluid. Disposed in the bypass line is slide valve to open up the bypass line and unload and render the unloadable gear element inoperative. Control is provided by a Full Authority Digital Electronic Control and its associated Hydromechanical Unit which uses the fuel as a hydraulic fluid to actuate the slide valve.

12 Claims, 5 Drawing Sheets

GAS TURBINE FUEL PUMPING APPARATUS

BACKGROUND OF THE INVENTION

1. Field of the Invention

This invention relates to main fuel pump for a gas turbine engine and particularly to a fuel pump which can be partially unloaded when the total flow of the pump is not required thereby preventing of excessive flow and heat from being generated.

The invention described herein was made in the performance of work under a government contract and the government has rights therein.

2. Description of Related Art

Modern gas turbine engines often employ positive displacement fuel pumps generally having one or two gear-type pumping elements and, as in the preferred embodiment of the present invention, may incorporate an integral centrifugal boost stage. Fuel pumps containing two gear stages may be connected in series or in parallel as in the present invention.

Conventional positive displacement fuel pumps are generally designed to supply more fuel than is needed for the engine's operation and particularly for partial power operation as during cruise and idle descent. The reduction in fuel pumping requirements is often referred to as the turn down ratio and can, for example, be on the order of 50 to 1 wherein the required pumping at idle descent is 2 percent of the amount required during takeoff. The fuel control determines the amount of fuel required for engine operation and bypasses the remainder back to the pump. This bypass flow is generally routed to the intake side of the high-pressure elements. A relief valve generally disposed in the discharge port of a conventional pump opens at a first predetermined pressure, for example 900 psi, and is capable of bypassing the total flow at a second higher predetermined pressure, for example 960 psi. This permits fuel at the pump discharge pressure to be recirculated as a protection against "dead-heading" the pump. The bypass fuel is routed to the inlet side of the two high-pressure elements.

The problem with such a fuel pump is that the redundant pumping results in increased heat load to the fuel system that must be cooled. This leads to the requirement of larger pumps than would otherwise be necessary. Fuel is often used in fuel to oil heat exchangers for cooling the engine's oil and the increased fuel temperature reduces its effectiveness for engine oil cooling thereby requiring larger or additional oil cooling heat exchangers which adds undesirable additional weight to the engine.

SUMMARY OF THE INVENTION

The invention provides fuel pumping apparatus for gas turbine engines which includes at least two parallel positive displacement gear type elements and a means for unloading one of the elements. In the preferred embodiment the fuel pumping apparatus of the present invention further includes a centrifugal boost stage upstream of the gear elements and a check valve near the outlet of the unloadable gear element which is operable to prevent fuel from flowing directly from the high pressure side of the other gear element when the unloadable gear element is unloaded. The unloading means of the preferred embodiment provides a bypass line which provides a flow path from a pressurizing chamber of the gear elements, which is used to urge the bearings of the gear elements into contact with the revolving gears, to the inlet of the pump upstream of the centrifugal stage thereby enabling the gears to pump fluid. Disposed in the bypass line is slide valve to open up the bypass line and unload and render the unloadable gear element inoperative. A control means is provided to operate the valve means. In the preferred embodiment control is provided by a Full Authority Digital Electronic Control and its associated Hydromechanical Unit which uses the fuel itself as a hydraulic fluid to actuate the slide valve.

BRIEF DESCRIPTION OF THE DRAWINGS

References made to top, side, and front views are made only for reference purposes only to more clearly explain the invention and not to limit the scope of the invention. The foregoing aspects and other features of the invention are explained in the following description, taken in connection with the accompanying drawings where.

DESCRIPTION OF THE PREFERRED EMBODIMENTS

Figure 1:
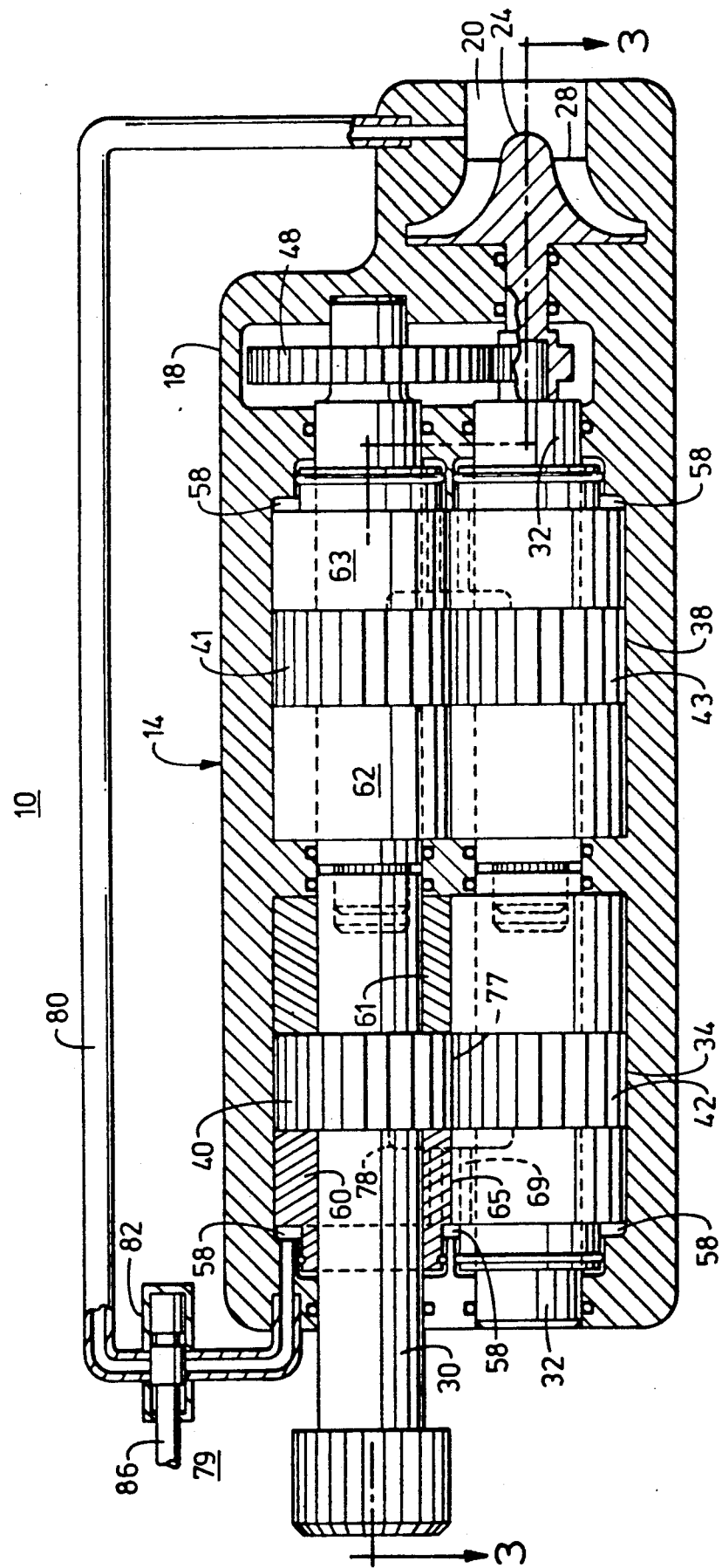
FIG. 1 is a front partial cut away and cross-sectional view of a gas turbine engine fuel pump incorporating features of the present invention.

Referring to FIG. 1, a gas turbine fuel pumping apparatus generally shown at 10 comprises a parallel dual element positive to displacement fuel pump 14 having a pump housing 18 and an inlet 20 and outlet 22 (shown in FIGS. 2 and 3) disposed through housing 18. A centrifugal boost stage 24 having an impeller 28 is disposed down stream of inlet 20. Parallel first and second gear elements 34 and 38 are disposed downstream of boost stage 24 and include first gears 40 and 41 and second gears 42 and 43 which, for reference purposes only, may be referred to as upper gears 40 and 41 and lower gears 42 and 43 of their respective elements 34 and 38. A drive shaft 30 is disposed through and within housing 18 and is drivingly engages upper gears 40 and 41 of both first and second gear elements 34 and 38 respectively, which in turn are operable to drive their lower gears 42 and 43 of first and second gear elements 34 and 38. Lower gears 42 and 43 of first and second gear elements 34 and 38 are mounted on a lower drive shaft 32. Note that both shafts are segmented and include means for connecting the segments in order to facilitate assembly and mounting within housing 18 drive. A gear box 48 is drivingly connected to an end of drive shaft 30 within housing 18 and is drivingly connected to impeller 28 of centrifugal boost stage 24 which is journaled upon and operable to turn on an end of lower shaft 32.

Shafts 30 and 32 are supported by 4 sets of bearings 60, 61, 62, and 63 and the bearings are in turn mounted within housing 18. Each set of bearings has an upper and lower bearing such as 60U and 60L respectively which are essentially mirror images of each other. Briefly referring to FIG. 2, upper bearing 60U and lower bearing 60L have flat mating surfaces generally shown at 65 which fix their rotational or circumferential position with respect to housing 18 and gear element inlets 77 and outlets 78. The bearings all have some axial clearance with respect to housing 18 to allow for thermal growth.

Figure 1A:
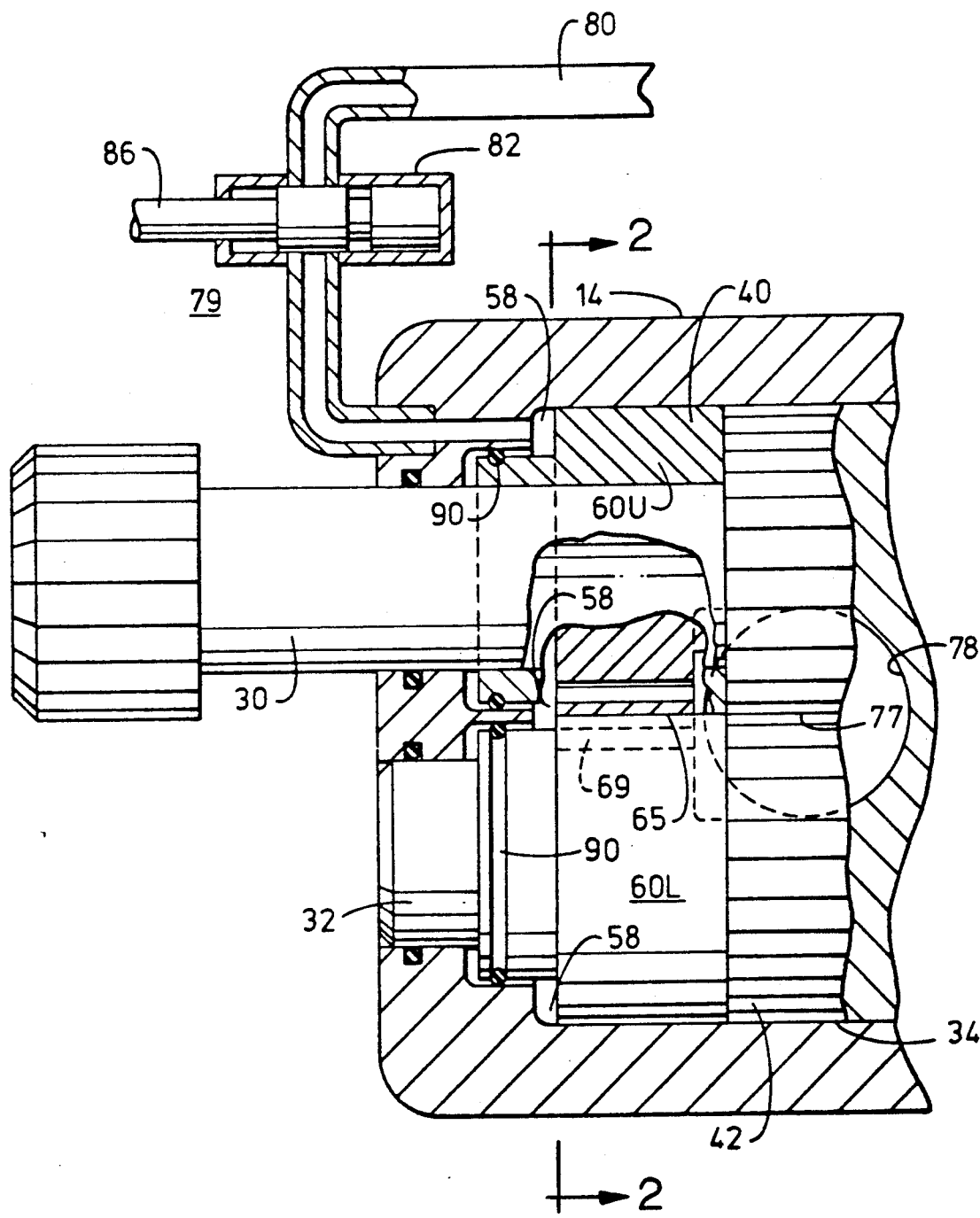
FIG. 1A is an enlarged view of a left hand portion of the pump in FIG. 1 having a cut taken at a different location so as to more distinctly show the features of the bearings and pressurizing cavity of the present invention.
Figure 2:
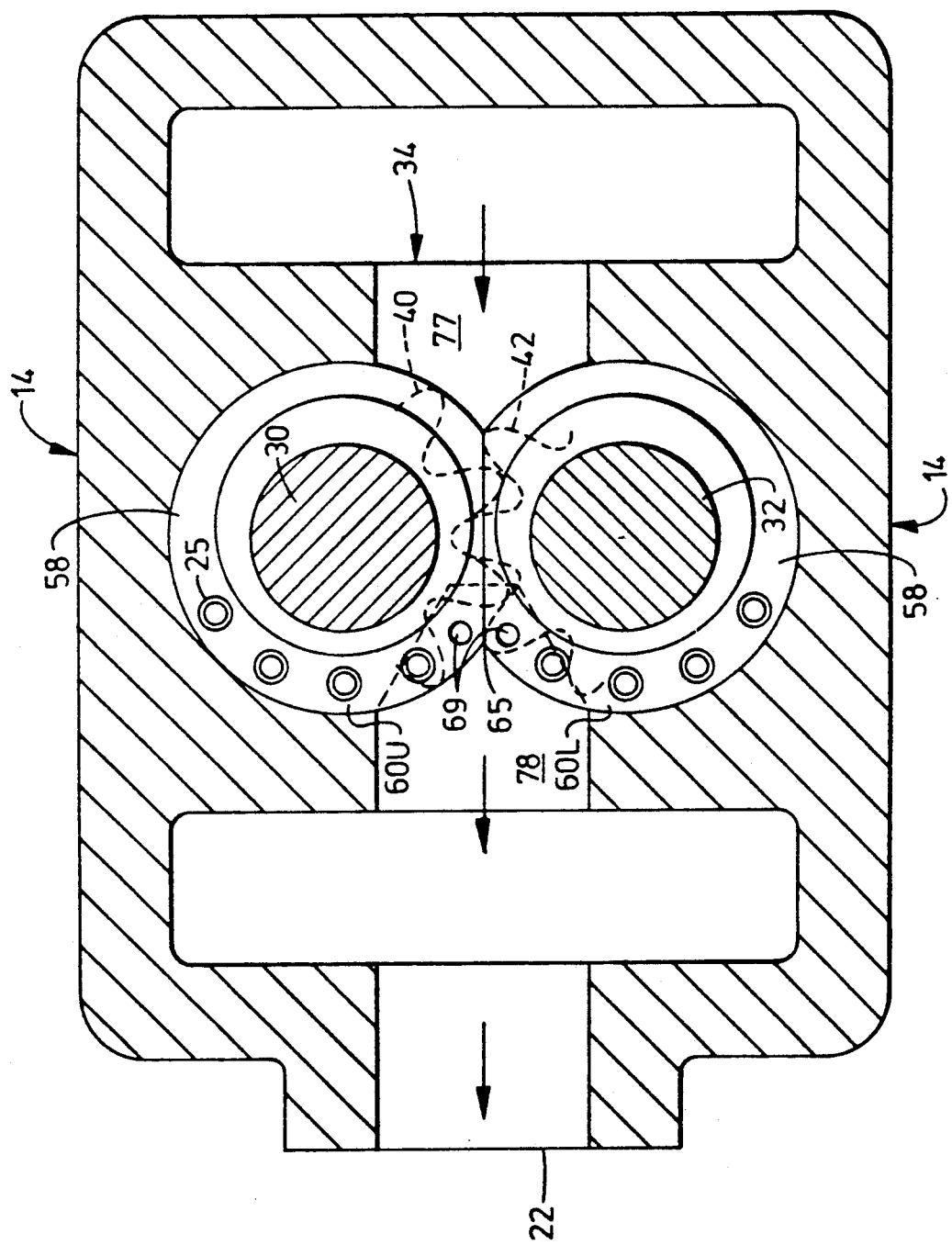
FIG. 2 is a sideways cross-sectional view taken along line 22 in FIG. 1.
Figure 3:
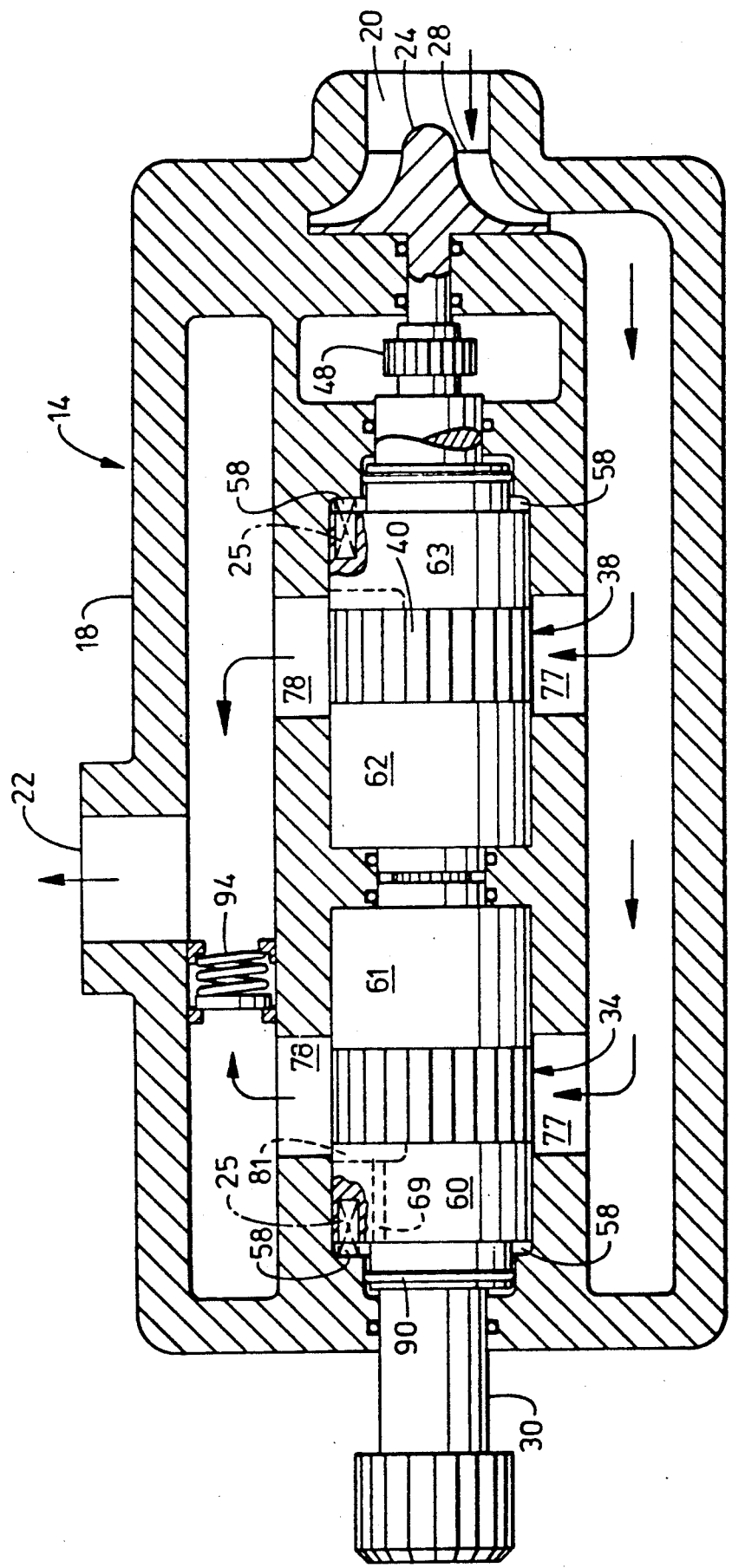
FIG. 3 is a top cross-sectional view taken along line 3—3 in FIG. 1.

Referring to FIGS. 1, 1A and 2, a FIG. 8 like pressurization chamber 58 is disposed between housing 18 and bearings 60U and 60L and similarly between housing 18 and bearing set 63. O rings 90 are disposed on shafts 30 and 32 to help pressurize chambers 58. A set of pressurizing holes 69 are disposed through outer bearings 60U and 60L as well as the second set of outer bearings 63. Pressurizing holes 69 provide a fluid pressure path from outlet 78, a high pressure side of element 34, to chambers 58, more particularly shown in FIGS. 1A, 2, 3, and 4. Bearing 60 includes an anti-cavitation chamber 81 between an end of hole 69 and outlet 78 and the other end of bearing 60 has spring means 25 to help urge the bearings into contact with element 34. Up until this point the pumping apparatus of the present invention generally resembles a conventional parallel dual element positive displacement fuel pump as can be found in the referenced GE CF6 fuel pump or in a military engine such as the GE F110 engine. During operation chambers 58 are pressurized which, together with spring means 25, forces the end sets of bearings 60 and 63 against their respective elements 34 and 38 to provide pumping action by the elements. Reference is now had to FIG. 3 which includes arrows depicting the direction and path of the fuel flow. The fuel enters pump 14 at inlet 20 where it is pressurized by centrifugal boost stage 34 after which it flows essentially in parallel to positive displacement stages or gear elements 34 and 38 where it enters on the low pressure sides 77 and discharges on the high pressure sides 78. Gear element 34 is unloadable and therefore a check valve 94 is provided to prevent fuel from the other gear element, second element 38, from flowing back through unloadable gear element 34 to the low pressure side of gear element 38 thereby rendering the entire positive displacement fuel pump inoperable.

Figure 4:
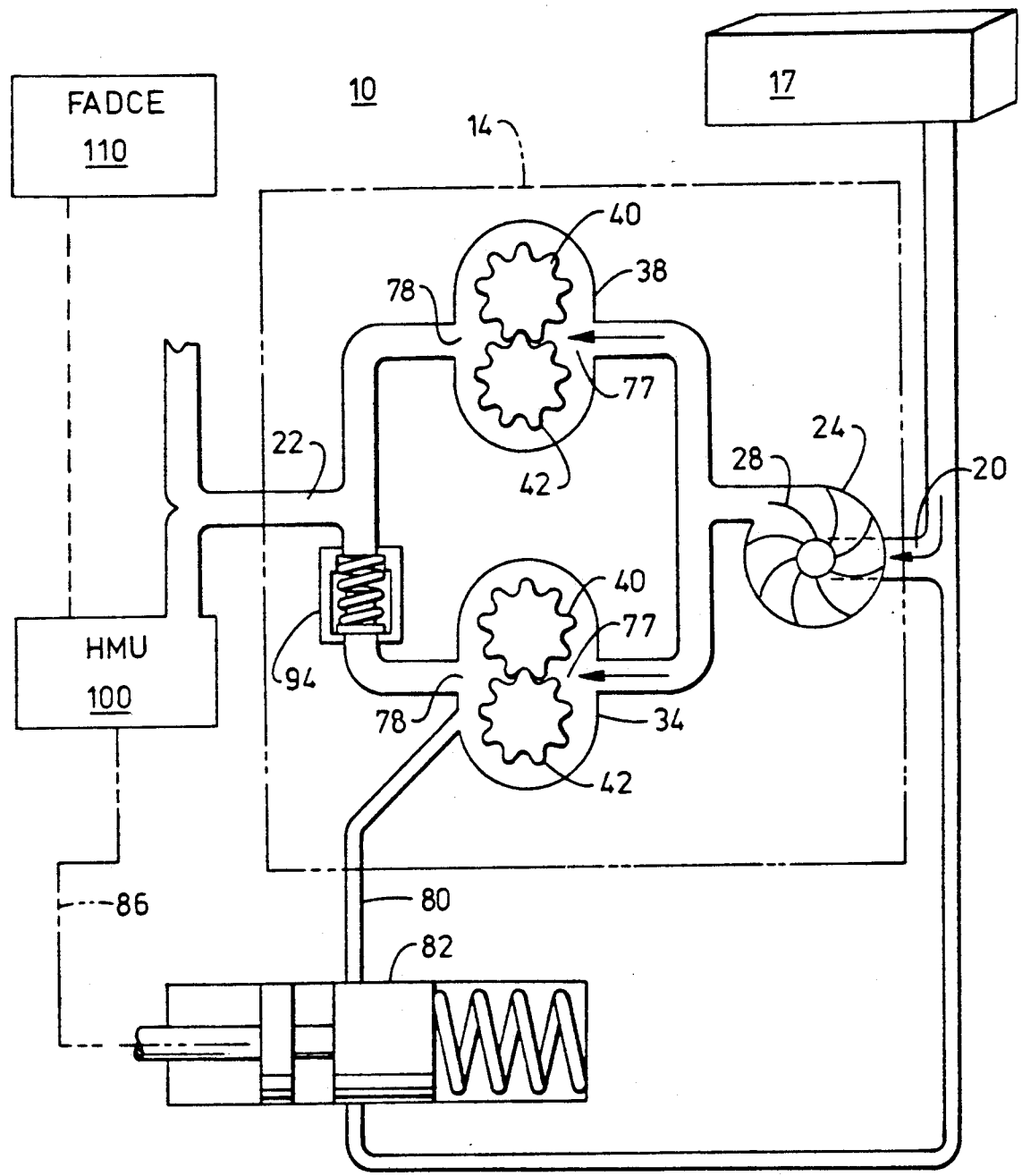
FIG. 4 is a schematic view of the fuel pump apparatus of the present invention.

Referring to FIG. 1A, the present invention further provides an unloading means generally shown at 79 which includes a bypass line 80 extending from chamber 58 of first element 34 to inlet 20 of pump 14. A controllable slide valve 82 is disposed in bypass line 80 for opening up and closing off bypass line 80 thereby providing a means to control unloadable element 34. Referring to FIG. 4, a hydraulic signal line 86 is provided, which is operable to provide slide valve 82 with an actuating signal from a conventional Hydromechanical Unit 100, commonly referred to as an HMU. Controllable unloading means 70 uses the pressurized fuel from pump 14 as the hydraulic fluid which is supplied by the HMU or engine control, which in turn is controlled by a Full Authority Digital Electronic Control (FADEC) 110, which in the preferred embodiment controls the operation of fuel pumping apparatus 10. Still referring to FIG. 4, during operation fuel is generally supplied to gas turbine fuel pumping apparatus 10 from the fuel tank 17. The dual element positive displacement fuel pump 14 receives the fuel at its inlet 20 where it is ported to boost stage 24. The fuel is then flowed in parallel to first and second gear elements 34 and 38 where the fuel is further pumped and then it is flowed to the rest of the fuel system (not shown) where it is pressurized to a required level of pressure. Referring briefly to FIGS. 1 and 1A, the gear elements are made operative by the pressurization of chambers 58 which in turn urge the set of end bearings 60 and 63 against their respective gears 40 and 42. The pressurizing fuel is conducted from the fuel flow path near the high pressure side 78 of gear elements 34 and 38 in pump 14 through holes 69 in end bearings 60.

Again referring to FIG. 4, boost stage 24 and spring means 25 provide the initial pressure for this action during engine start-up. When the full flow produced by fuel pump 14 is no longer required an instruction is sent from FADEC 110 to HMU 100 to unload element 34 so that it no longer pumps any fuel. To this end a pressure signal is sent through actuator line 86 to slide valve 82 to open the slide valve thereby allowing pressurizing chamber 58 to be depressurized and permitting outer bearings 60 to C6F move away from unloadable gear element 34 which unloads and stops the pumping action of the unloadable gear element. When the fuel pumping capacity of unloadable element is required again, an instruction to close the valve is issued by FADEC 110 and HMU 100 which in turn sends the appropriate pressure signal to slide valve 82 to close it. This action repressurizes chamber 58 which reloads unloadable gear element 34 which then resumes pumping fuel.

Referring briefly to FIG. 1 not that when unloadable gear element 34 is unloaded by bypass line 80 is open fuel is permitted to circulate through element 34 thereby cooling it during the unloaded period of its operational cycle.

The present invention may be usee to cut down the flow rate of fuel under flight and engine conditions that are programmed into FADEC 110. These conditions include idle descent and others which employ high turn down ratios (on the order of 50 to 1) in the pumping requirements. This in turn reduces the amount of unnecessary pumping, i.e., by fuel heating which would otherwise lower the fuel's capacity to cool the engine oil.

While the present invention has been described with reference to specific embodiments thereof, it will be obvious to those skilled in the art that various changes and modifications may be made without departing from the invention in its broader aspects. It is contemplated in the appended claims to cover all such variations and modifications of the invention which come within the true spirit and scope of our invention.

What is claimed as new and desired to be secured by Letters Patent of the United States is:

1. An engine fuel pump apparatus comprising:
   a positive displacement fuel pump having at least first and second pumping elements,
   a means for unloading one of said elements so that it substantially stops pumping.
   said unloading means comprising;
   a set of end bearings supporting said unloadable element,
   a pressurizing chamber which receives said bearings and which is used to urge said bearings into contact with said elements during their operation thereby enabling said elements to pump,
   a duct axially disposed through said bearing and in fluid pressure communication with a high pressure discharge side of said unloadable element on one side of said duct and said pressurizing chamber on the other side of said duct,
   a bypass line leading from said pressurizing chamber to a position upstream of said unloadable element, a controllable bypass valve inserted in said bypass line, and a control means to control said unloading means.

2. An apparatus as claimed in claim 1 wherein said control means further includes a means for monitoring engine conditions and sending a signal that is effective for controlling said unloading means as a function of an engine condition.

3. An apparatus as claimed in claim 1 wherein said control means further includes a means for monitoring idle descent and sending a signal that is effective for controlling said unloading means as a function of idle descent.

4. An apparatus as claimed in claim 2 wherein said engine condition is one that requires a high turn down ratio for the pump.

5. An apparatus as claimed in claim 1 wherein said bypass valve is a hydraulic slide valve controlled by an engine controller.

6. An apparatus as claimed in claim 5 wherein said hydraulic slide valve is operated by an engine controller using fuel as its hydraulic actuation fluid.

7. An apparatus as claimed in claim 5 wherein said engine controller is a digital electronic engine control.

8. A gas turbine engine fuel pump apparatus comprising:

a positive displacement fuel pump having at least first and second parallel gear type elements, a means for unloading one of said elements so that it substantially stops pumping, said unloading means comprising:

a set of end bearings supporting said unloadable element, a pressurizing chamber which receives said bearings and which is used to urge said bearings into contact with said elements during their operation thereby enabling said elements to pump, a duct axially disposed through said bearing, said duct in fluid pressure communication with a high pressure discharge side of said unloadable element on one side of said duct and said pressurizing chamber on the other side of said duct, a bypass line leading from said pressurizing chamber a position upstream of said unloadable element, and a controllable bypass valve inserted in said bypass line and, a control means to control said unloading means.

9. A gas turbine engine fuel pump apparatus as claimed in claim 8 wherein said by pass valve is a hydraulic slide valve powered by a hydromechanical unit which is controlled by a digital electronic engine control.

10. A gas turbine engine fuel pump apparatus as claimed in claim 9 wherein said control means further includes a means for monitoring engine and flight conditions and sending a signal to said hydromechanical unit to control said unloading means as a function of at least one said engine and flight conditions.

11. A gas turbine engine fuel pump apparatus as claimed in claim 10 wherein said engine condition is idle descent.

12. A gas turbine engine fuel pump apparatus as claimed in claim 10 wherein said condition is one that requires a high turn down ratio for the pump.

* * * * *